United States Patent
Eisenman et al.

(10) Patent No.: US 12,032,597 B1
(45) Date of Patent: Jul. 9, 2024

(54) AUTHORIZED ROLES AND CONTACT MASTER

(71) Applicant: Wells Fargo Bank, N.A., San Francisco, CA (US)

(72) Inventors: Patrick C. Eisenman, Monroe, CT (US); Michael David Gathman, Fort Mill, SC (US); Arun Kallikadavil, Charlotte, NC (US); Michael Alexander Dunlop MacGill, Charlotte, NC (US); Santosh R. Papagari, Dublin, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

(21) Appl. No.: 18/154,969

(22) Filed: Jan. 16, 2023

(51) Int. Cl.
*G06F 16/28* (2019.01)
*G06F 16/22* (2019.01)

(52) U.S. Cl.
CPC ........ *G06F 16/282* (2019.01); *G06F 16/2282* (2019.01)

(58) Field of Classification Search
CPC .................. G06F 16/282; G06F 16/2282
See application file for complete search history.

(56) References Cited

U.S. PATENT DOCUMENTS

| | | | |
|---|---|---|---|
| 11,651,287 B1 * | 5/2023 | Kostakis | G06F 8/61 706/12 |
| 2021/0029129 A1 * | 1/2021 | Gupta | H04L 63/08 |
| 2021/0073335 A1 * | 3/2021 | Hou | G06F 40/177 |
| 2023/0050511 A1 * | 2/2023 | Michelsen | G06Q 10/10 |
| 2023/0199025 A1 * | 6/2023 | Xu | H04L 63/0861 726/22 |

* cited by examiner

*Primary Examiner* — Dangelino N Gortayo
(74) *Attorney, Agent, or Firm* — SCHWEGMAN LUNDBERG & WOESSNER, P.A.

(57) ABSTRACT

Various examples described herein are directed to systems and methods that retrieve data from an information source. The data includes a first data set for a party and a second data set. The second data set has an entity associated with the party and a role of the party at the entity. The first data set is stored at a database and the second data set is stored at a cross-reference table associated with the database. A data request for requested information is received and the first data set is retrieved from the database. The second data set is retrieved from the cross-reference table based on the first data set. A hierarchical structure is created based on the second data set, where the hierarchical structure has different lists based on one of the entity and the role of the party at the entity.

20 Claims, 8 Drawing Sheets

| Company A Results | | | | |
|---|---|---|---|---|
| Mac J 208 | Auth. Rep 226 | Product A 232 | 3342FJ 210 | (612)373-6900 212 | MacJ@CompanyA.com 220 |
| Kennedy J 308 | Auth. Signer 320 | Product A 232 | 1003FJ 310 | (612)349-9590 312 | KennedyJ@CompanyA.com 316 |

602 → Mac J
604 → Kennedy J

FIG. 6

| Authorized Representative Results | | | | |
|---|---|---|---|---|
| Mac J | Company A | Product A | 3342FJ | (612)373-6900 | MacJ@CompanyA.com |
| Kennedy J | Company D | Product D | 1003FJ | (612)349-9590 | KennedyJ@CompanyD.com |

702 → Mac J
704 → Kennedy J

ND CONTACT
AUTHORIZED ROLES AND CONTACT MASTER

BACKGROUND

An individual may have multiple roles across multiple legal entities. For example, the individual may be an authorized representative at a first legal entity and an assigned preparer at a second legal entity that is different from the first legal entity. Furthermore, the individual may be some other type of authorized role including but not limited to authorized signer at a third legal entity that is different from the first and second legal entities. This can go on for any combination of different individuals, product types, authorization roles, legal entities. The individual may or may not have different contact information associated with each of the legal entities, such as but not limited to different email addresses, different physical addresses, or different telephone numbers.

Data associated with the individual having multiple roles across multiple legal entities is stored across multiple repositories. Currently, no central repository exists that stores the data associated with the individual having multiple roles across multiple legal entities. As such, this data lacks central visibility that results in disjointed management. Furthermore, duplicate data, i.e., data relating to the individual being an authorized representative at the first legal entity, may be stored in multiple locations due to the absence of a central repository, thereby increasing overhead and depleting network resources. Also connecting data to the associated signed documents takes multiple systems and clicks to find.

Therefore, what is needed is a system and method that solves the problems of the disjointed management of data associated with individuals having multiple roles across multiple legal entities. The system and method should be able to help a user create a record for an entity and help a user find an existing record for an entity.

SUMMARY

Examples relate to a contact master (CM) system that can provide a central repository for data associated with an individual having multiple roles across multiple legal entities. The CM system can store baseline data associated with the individual, such as the name of the individual and base contact information for the individual. The baseline data can refer to data that meets requirements to ensure accurate matches and individual uniqueness. The CM system can be linked with cross-reference tables that can each store additional data associated with the individual in their capacity at different legal entities. For example, the cross-reference tables can include a role the individual has with a particular legal entity along with contact information associated with the individual in their role at the particular legal entity. A first cross-reference table can store data associated with an individual at a first legal entity along with the role the individual has at the first legal entity and contact information for the individual at the first legal entity. A second cross-reference table can store data associated with the individual at a second legal entity along with the role the individual has at the second legal entity and contact information for the individual at the second legal entity. A third cross-reference table can store data associated with the individual at a third legal entity along with the role the individual has at the third legal entity and contact information for the individual at the third legal entity.

The CM system can be configured to provide customizable hierarchal search results for data managed by the CM system and stored in the cross-reference tables. The hierarchical search results can be organized according to the data based on attributes of the stored data. The attributes can include the legal entity, the role of the individual for the legal entity, products associated with the individual in their capacity at the legal entity, or the like. The CM system can be configured to provide hierarchical search results based on a legal entity. As an example, using the data stored at the central repository and the cross-reference tables, the system can return legal entity hierarchical search results where all individuals associated with the legal entity are returned. The hierarchical search results can also include the roles each of the individual have in their capacity at the legal entity and any products the individual relating to the legal entity is associated with. In further examples, using the data stored at the CM system and the cross-reference tables, the CM system can return role hierarchical search results where all individuals having a particular role, such as an authorized signer, are returned. Here, the hierarchical search results can include the legal entities of those having the role of authorized signer along with any products associated with the individuals having the particular role. The hierarchical search results for the legal entity can differ from the hierarchical search results for the role. Thus, hierarchies can be built around different attributes. For example, a hierarchy can be built around an individual, a hierarchy can be built around a legal entity, a hierarchy can be built around roles of individuals at legal entities, and a hierarchy can be built around a product associated with individuals at legal entities.

The master copy of the contact allows for these various hierarchies to exist. The flexibility of maintaining the information as it was received as well as aggregating into a master golden copy is the key to contact master's flexibility. So long as the Contact Master ID's are used the amount of information for an individual across all associated legal entities can be stored separately but queried as an aggregate as well. This allows for infinite customization for any data attribute related to a Contact Master ID or legal entity.

DETAILED DESCRIPTION

A CM system can provide a central repository for data associated with an individual having multiple roles across multiple legal entities. The CM system can be created with a mastering process where baseline data associated with the individual is stored at the CM system. The baseline data can correspond to data that is consistent for the individual across different legal entities, different roles, different products, or the like. The baseline data can include a name of the individual, an address of the individual, and a telephone number of the individual. However, the baseline data is not restricted to this type of data.

The CM system can be linked with cross-reference tables that can each store data associated with different legal entities where the individual has an association with each of the different legal entities. The data stored in each of the cross-reference tables can store additional data associated with the individual. A first cross-reference table can store data associated with an individual at a first legal entity, such as a role of the individual at the first entity, which can be an authorized representative. The first cross-reference table can also store contact information for the individual and a first product that the individual handles at the first legal entity. A second cross-reference table can store data associated with the individual at a second legal entity, such as a role of the individual at the second entity, which can be an authorized signer at the second legal entity. The second cross-reference table can also store contact information for the individual along with a second product that the individual handles at the second legal entity. A third cross-reference table can store data associated with the individual at a third legal entity, such as a role of the individual at the third entity, which can be an authorized user at the third legal entity. The third cross-reference table can also store contact information for the individual and a third product that the individual handles at the third legal entity.

The CM system can provide hierarchical search results for an individual, a product, or a legal entity using the cross-reference tables linked to the CM system. While an individual, a product, or a legal entity are discussed as the basis for providing hierarchical search results, this disclosure is not limited to these examples. The hierarchical results can be different depending on the filter used to generate the results. To further illustrate, if a user desires to perform a search based on an individual, the CM system can return search results that show the different legal entities, products, and roles the individual has. If a user desires to perform a search based on a role, the CM system can return search results that list different individuals at different legal entities having the role. Moreover, if a user desires to conduct a search based on a legal entity, the CM system can return search results that list different individuals at the legal entity along with the different roles of the different individuals at the legal entity have and the products handled by the different individuals at the legal entity.

Figure 1:
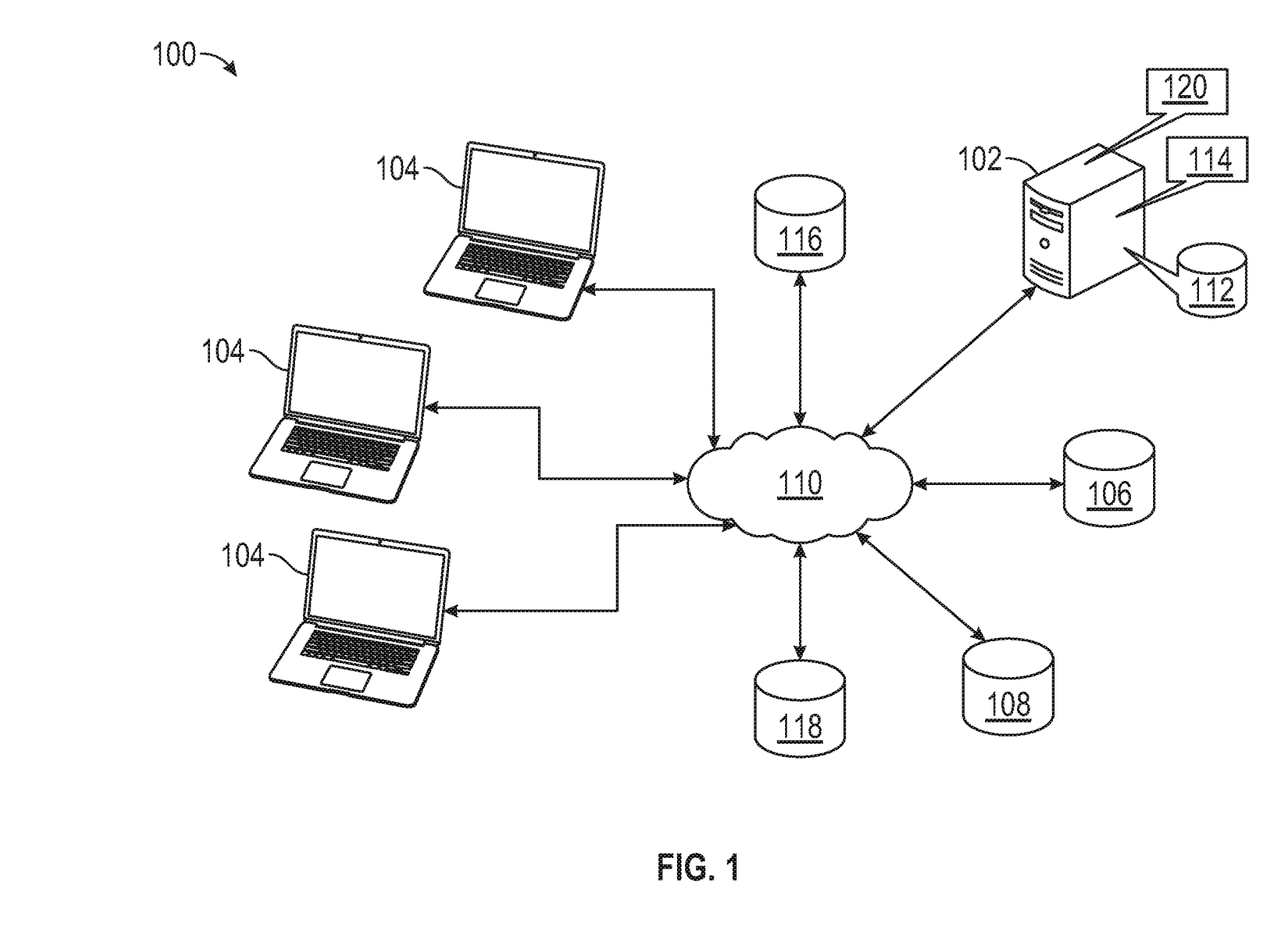
FIG. 1 shows an environment in which examples may operate, in accordance with examples.

Now making reference to FIG. 1, an environment 100 is shown in which examples can operate. The environment 100 can include a CM system 102 and relational manager (RM) devices 104 along with databases 106 and 108. The environment 100 can also include a network 110 which can facilitate communication between the CM system 102, the RM devices 104 and the databases 106 and 108.

The CM system 102 and the RM devices 104 can incorporate an architecture that facilitates operation in the capacity of either a server of a client machine in server-client network environments, where each of these devices may be implemented as any type of computing device, such as a server computer, a personal computer (PC), or the like each having a processor configured to perform the subject matter disclosed herein. The RM devices 104 can be any computing device suitable for use by a user. For example, the devices may be a desktop computer, a tablet computer, a portable media device, or a smart phone belonging to a user. In addition, the CM system can include a local database 112, which can allow local storage of data associated with various users such that the CM system 102 can function as a master data management repository.

The databases 106, 108, and 112 can be any type of data storage resource and can store data structured as a text file, a table, a spreadsheet, a triple store, a hierarchical data store, or any suitable combination thereof. Moreover, the databases 106 and 108 can be combined into a single machine, database, or device, and the functions described herein for any single machine, database, or device may be subdivided among multiple machines, databases, or devices.

The network 110 can be any network that enables communication between or among machines, databases, and devices (e.g., the CM system 102, the RM devices 104, the databases 106 and 108). Accordingly, the network 110 can be a wired network, a wireless network (e.g., a mobile or cellular network), or any suitable combination thereof. The network 110 may include one or more portions that constitute a private network, a public network (e.g., the Internet), or any suitable combination thereof. Accordingly, the network 110 can include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 110 can communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

The CM system 102 can include a golden copy (GC) 114 that can store a first data set that can be baseline data associated with an individual. As used herein, an individual can also be referred to as a party. The GC 114 and the first data set can be stored locally at the database 112. Moreover, the GC 114 can be stored at the database 106 or the database 108. The baseline data can be agnostic information associated with the individual. In particular, the baseline data can be the same regardless of an association of the individual with different legal entities, different roles the individual can have, different products the user can be handling or responsible for, and the like. The baseline data associated with an individual can include a name of the individual, an internal database identifier associated with the individual, and a phone number of the individual. However, the baseline data is not restricted to these examples. As will be discussed further below, the GC 114 can be linked to cross-references tables. The cross-reference tables can be the sources of the first data set in the GC 114. In addition, as will be discussed further below, the cross-reference tables can include additional data associated with the individual.

The GC 114 can be created with a mastering process where data associated with an individual is gathered from various sources, such as databases 116 and 118. The databases 116 and 118 can have the same functionality and features as the databases 106, 108, and 112 described above. Here, the databases 116 and 118 can include data from various sources that can be associated with the same individual. The data from the various sources can be used to create the GC 114.

The various sources can include baseline data for a user. The baseline data from the various sources can be used to create a GC for the user, such as the GC 114. In some instances, the various sources may include different baseline data. For example, a first source can include first contact information, such as a first telephone number, while a second source can include second contact information, such as a second telephone number that is different from the first telephone number. In some examples, it could be desirable to have a single telephone number for an individual in a GC, such as the GC 114. The mastering process can include assigning winnability scores to the first telephone number and the second telephone number. Here assigning winnability scores can correlate to filtering the data. In an example, the telephone number having the highest winnability score can be selected as the telephone number to be included as the baseline data for an individual in the GC in the mastering process.

The winnability score can be determined in a multitude of ways. The source itself, such as a source of data typically stored at one of the databases 116 and 118, can be considered in determining the winnability score. If a first source historically is more trustworthy then a second source, then the telephone number from the first source can be selected for inclusion in the GC for the individual. The trustworthiness of a source can be determined in a number of ways. For example, if a first source relates to documents that are being filed for business purposes, such as opening a deposit account on behalf of an entity, such as a corporation, the data, such as a telephone number, should be complete and accurate, i.e., the telephone number should be a valid telephone number, such as (612) 373-6900. If a second source relates to a business contact entry, such as if customer relation manager (CRM) is creating a data entry associated with a prospective contact, the CRM may input a telephone number such as (919) 555-0000 in order to allow completion of the business contact entry. The telephone number may only be required for completion of the business contact entry and may not have to be a valid phone number. Here, the first source can be considered more trustworthy with regards to the telephone number since the entered telephone should be a valid telephone number in order to open a deposit account on behalf of an entity.

In addition to a trustworthiness of the source, the winnability score can be determined based on a structure of the data itself and a nullability of the data. To further illustrate, as noted above, the first source can include the telephone number (612) 373-6900 while the second source can include the telephone number (919) 555-0000. An algorithm, such as a machine learning algorithm, can be used to determine trustworthiness and can be taught that a telephone number having a particular three-digit exchange code, such as 555, is not a valid telephone number. Thus, the machine learning algorithm can recognize that the telephone number (919) 555-0000 is not a valid telephone number and can assign a low winnability score or nullify the telephone number. In addition, the algorithm can assign a higher winnability score to the telephone number (612) 373-6900.

Machine learning algorithms can be used to determine the trustworthiness of a source. In the valid telephone number example above, machine learning algorithms can be provided with training data relating to telephone numbers associated with a user and provided to open a deposit account as described above. Here, the training data can relate to identifying the first source as relating to the documents that are filed for business purposes as described above. Machine learning algorithms can be implemented to identify other accounts used for business purposes as being more trustworthy that source relating the business contact entries. Furthermore, machine learning algorithms can be trained over time with data relating to new sources and the trustworthiness associated with the new sources where the trustworthiness can change over time.

One or more machine learning algorithms are generated based on training data using one or more machine learning techniques. Machine learning is the study and construction of algorithms that can learn from, and make predictions on, data. Such algorithms operate by building a model from inputs in order to make data-driven predictions or decisions. Thus, a machine learning technique is used to generate a statistical model that is trained based on a history of attribute values associated with input and, optionally, users. The statistical model is trained based on multiple attributes (or factors) described herein. In machine learning parlance, such attributes are referred to as "features." To generate and train a statistical model, a set of features is specified and a set of training data is identified.

Examples are not limited to any particular machine learning technique for generating or training a machine learning model. Example machine learning techniques include linear regression, logistic regression, neural networks, random forests, naive Bayes, and Support Vector Machines (SVMs). Advantages that machine-learned models have over rule-based models include the ability of machine-learned models to output a probability (as opposed to a number that might not be translatable to a probability), the ability of machine-learned models to capture non-linear correlations between features, and the reduction in bias in determining weights for different features.

Machine learning can also envision the use of fuzzy matching where fuzzy matching can use various inbuild matching algorithms (a blend of probabilistic, heuristic, linguistic, phonetic, and/or empirical methods) based on the type of data being matched, with built-in algorithms for phonetic spellings and partial fields. This combination of approaches provides great flexibility and generates accurate results.

Initially, the number of features that are considered for training may be significant. After training a machine learning model and validating the model, it may be determined that a subset of the features have little correlation or impact on the final output. In other words, such features have low predictive power. Thus, machine-learned weights for such features may be relatively small, such as 0.01 or −0.001. In contrast, weights of features that have significant predictive power may have an absolute value of 0.2 or higher. Features will little predictive power may be removed from the training data. Removing such features can speed up the process of training future models and computing output scores.

The winnability score can also be determined based on a time stamp associated with the data. In particular, in an instance where telephone numbers from first and second sources both appear to be valid, a timestamp associated with when the telephone numbers were uploaded at the source can be used to determine a winnability score. Here, the more recent telephone number can be given a higher winnability score such that the more recent telephone number can be used for the GC associated with an individual.

The winnability score can also be determined based on an author of the baseline data. A CRM can enter baseline data during a process of completing a business contact entry. Moreover, a RM may have entered baseline data while facilitating the creation of a deposit account on behalf of an entity. Since a RM may typically open a deposit account, if a RM authored the baseline data, the baseline data provided by the RM can be given a higher winnability score than baseline data entered by the CRM.

As noted above, an individual can be associated with different legal entities where the individual can have different roles at the different legal entities. In addition, the individual can be handling different products at the different legal entities. The CM system 102 can aggregate the data pertaining to a user being associated with different legal entities, having different roles at the different legal entities, and handling different products at the different legal entities. Using this data, the CM system 102 can create cross-reference tables 200-204 that link with the GC 114, as shown with reference to FIG. 2. The cross-reference tables 200-204 can include second data sets along with the data that is the source of the first data set in the GC 114. Furthermore, the cross-reference tables 200-204 can be the source of the baseline data in the GC 114, such as baseline data 206. Here, the cross-reference tables can be stored at the database 106.

Figure 2:
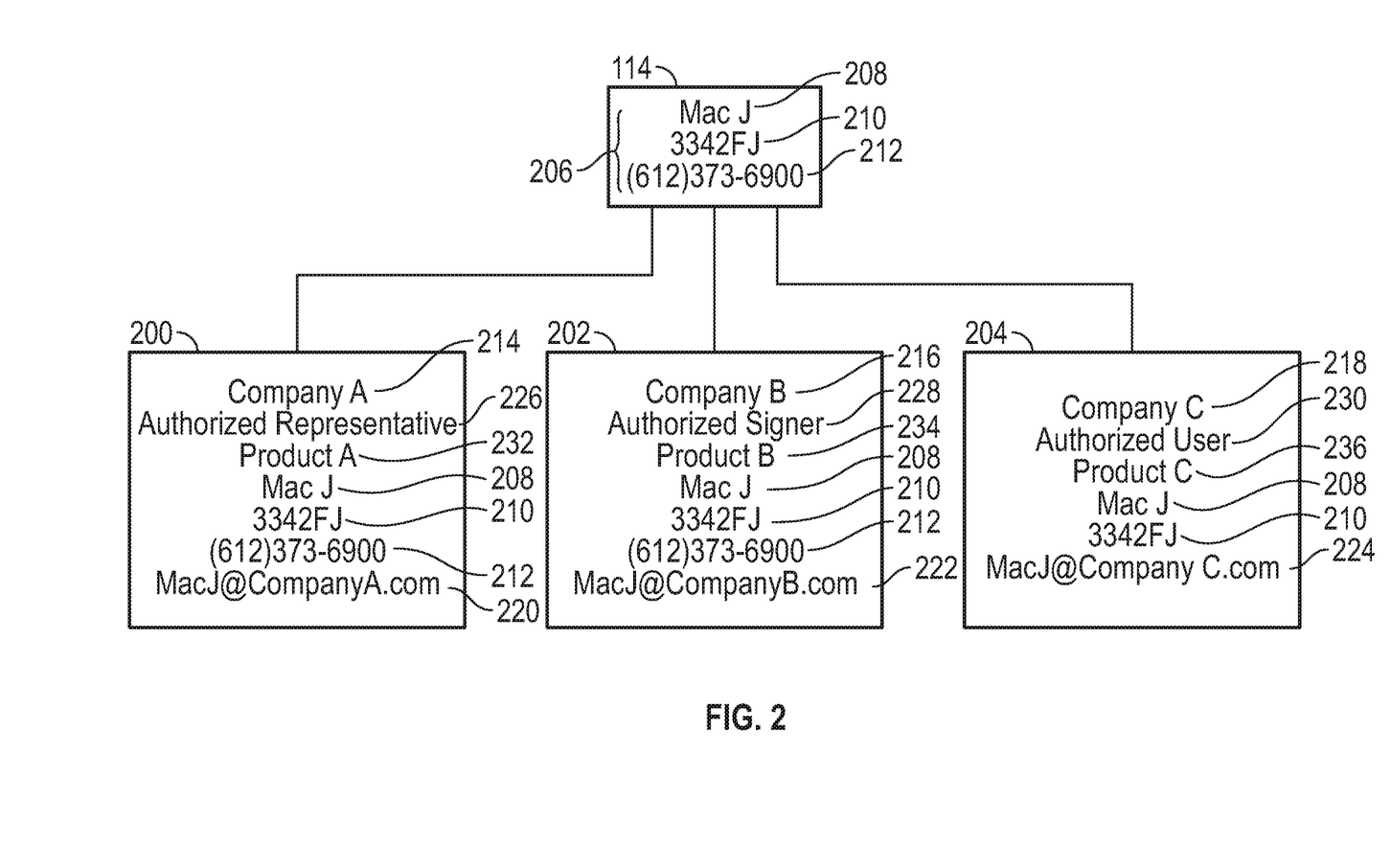
FIGS. 2 and 3 show cross-reference tables generated with a contact master system of FIG. 1, in accordance with examples.

The baseline data 206 can include a user id 208 that corresponds to an individual, an internal database identifier 210, and contact information 212. As used herein, reference to the user id 208 can refer to an individual or a user, such as Mac J (FIG. 2). Thus, when reference is made to the user id 208, this can refer to the user Mac J. The cross-reference tables 200-204 can include some, or all, of the baseline data 206. More specifically, the cross-reference tables 200 and 202 can include all of the baseline data 206 while the cross-reference table 204 can include only the user id 208 and the internal database identifier 210.

Each of the cross-reference tables 200-204 can include different data for the user id 208. Here, the user id 208 can be associated with legal entity 214, which can be Company A, legal entity 216, which can be Company B, and legal entity 218, which can be Company C. The user id 208 can have different contact information associated with the different legal entities. To further illustrate, the cross-reference table 200 lists an email address 220 as MacJ@CompanyA.com for the user id 208 at the legal entity 214. In addition, the cross-reference table 202 lists an email address 222 as MacJ@CompanyB.com for the user id 208 at the legal entity 216 while the cross-reference table 204 lists an email address 224 as MacJ@CompanyC.com for the user id 208 at the legal entity 218.

The cross-reference tables 200-204 can also list a role at the legal entities 214-218. For example, the cross-reference table 200 can a list a role 226, which can correspond to an authorized representative. The cross-reference table 202 can a list a role 228, which can correspond to an authorized signer. Furthermore, the cross-reference table 204 can a list a role 230, which can correspond to an authorized user.

The cross-reference tables 200-204 can also list a product being handled by the user id 208 at the legal entities 214-218. In particular, the cross-reference table 200 can a list a product 232 while the cross-reference table 202 can a list a product 234. Furthermore, the cross-reference table 204 can a list a product 236.

Figure 3:
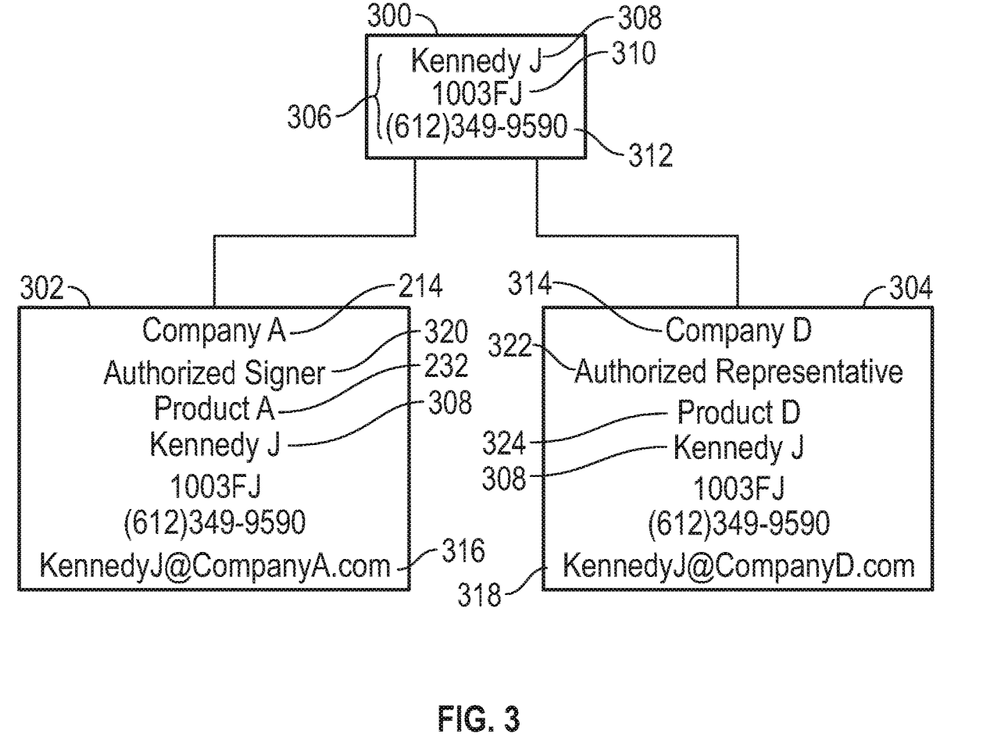

Another example of a GC is shown with reference to FIG. 3. In FIG. 3, a GC 300, which can have the same features and functionality of the GC 114, can be linked to cross-reference tables 302 and 304. The GC 300 can include baseline data 306 where the cross-reference tables 302 and 304 can be the sources for the baseline data 306. The baseline data 306 can include a user id 308 that corresponds to a user, an internal database identifier 310, and contact information 312. As used herein, reference to the user id 308 can refer to an individual or a user, such as Kennedy J (FIG. 3). Thus, when reference is made to the user id 308, this can refer to the user Kennedy J. The cross-reference tables 302 and 304 can include some or all of the baseline data 306 as discussed above with reference to the cross-references tables 200-204. Here, the cross-references tables 302 and 304 include all of the baseline data 306.

Each of the cross-reference tables 302 and 304 can include different data for the user id 308. More specifically, the user id 308 can be associated with the legal entity 214 along with legal entity 314, which can be Company D. At the legal entity 214, the user id 308 is an authorized signer while at the legal entity 314 the user id 308 is an authorized representative. The user id 308 can have different contact information associated with the different legal entities. In particular, the cross-reference table 302 lists an email address 316 as KennedyJ@CompanyA.com for the user id 308 at the legal entity 214. In addition, the cross-reference table 304 lists an email address 318 as KennedyJ@CompanyD.com for the user id 308 at the legal entity 314.

The cross-reference tables 302 and 304 can also list a role at the legal entities. For example, the cross-reference table 302 can a list a role 320, which can correspond to an authorized signer. In addition, the cross-reference table 304 can a list a role 322, which can correspond to an authorized representative. The cross-reference tables 302 and 304 can also list a product being handled by the user id 308 at the legal entities 214 and 314. In particular, the cross-reference table 302 can list a product 324 and the cross-reference table 304 can list a product 324 each being handled by the user id 308 at the legal entities 214 and 314.

The CM system 102 can be configured to provide customizable hierarchal search results for data managed by the CM system 102 and stored in the cross-reference tables 200-204, 302, and 304. More specifically, if a user is searching for individuals that are associated with a particular legal entity, the user could conduct a search for the particular legal entity. Here, the CM system 102 can search the cross-reference tables 200-204, 300, and 302 for the particular legal entities. Results that list individuals associated with the particular legal entity can be outputted that includes the baseline data, such as the baseline data 206 and 306, along with roles of the individuals at the legal entity, such as the roles 226-230, 320, and 322. Furthermore, the results associated with the particular legal entity can list the products being handled by the individual at the particular legal entity, such as the products 232-236 and 324, along with email addresses of the individuals at the particular legal entity, such as the email addresses 220-224, 316, and 318.

In addition to conducting a search based on a legal entity, a search of the GCs 114 and 300 and the cross-reference tables 200-204, 302, and 304 can be done based on a role of an individual and/or a product being handled an individual at a legal entity. When a search is conducted based on a role of an individual, the cross-reference tables 200-204, 300, and 302 can be searched for the particular roles. Results that list individuals associated with the particular legal entity can be outputted that includes the baseline data, such as the baseline data 206 and 306, along with a name of the legal entities, such as the legal entities 214-218 and 314. Furthermore, the results associated with the particular legal entity can list the products being handled by the individual at the particular legal entity, such as the products 232-236 and 324, along with email addresses of the individuals at the particular legal entity, such as the email addresses 220-224, 316, and 318.

When a search is conducted based on a product being handled by an individual at a legal entity, the cross-reference tables 200-204, 300, and 302, can be searched for products being handled by individuals at the legal entities 214-218 and 314. Results that list individuals associated with the particular legal entity can be outputted that includes the baseline data 206 and 306 along with a name of the legal entities 214-218 and 314. Furthermore, the results associated with the particular legal entity can list the roles 226-230, 320, and 320 of the individuals at the legal entities 214-218 and 314 along with the email addresses 220-224, 316, and 318.

Figure 4A:
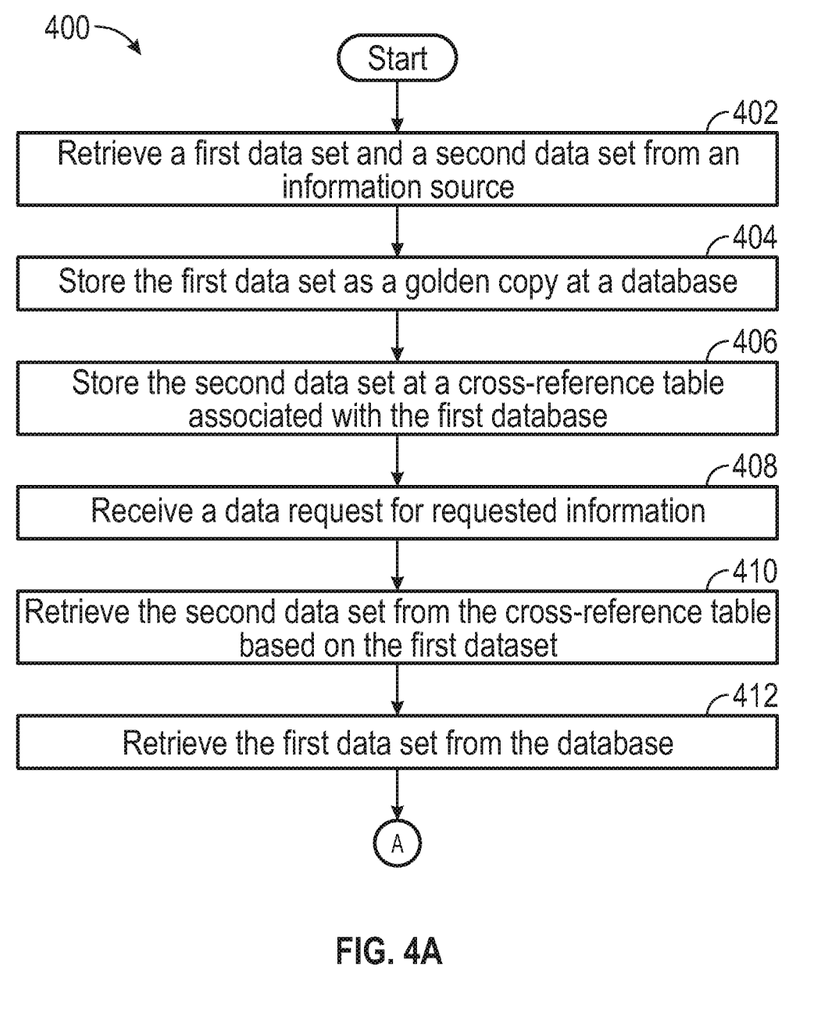
FIGS. 4A and 4B illustrate a method of creating a hierarchical structure, in accordance with examples.

Now making reference to FIG. 4A, a method 400 of creating a hierarchical structure is shown. Initially, during an operation 402, a first data set and a second data are retrieved from a data source. The first data set can relate to an individual and can include baseline data, such as the baseline data 206. During the operation 402, data sources, such as the database 116 and 118, can be accessed by the CM system 102 for the baseline data, as discussed above. In instances where different baseline data, such as contact information for an individual exists, a winnability score can be determined as discussed above during the operation 402. In examples, the baseline data can be first the data set.

The second data set can relate to data for an individual in relation to a legal entity. As discussed above, an individual can be associated with different legal entities while having different roles at different legal entities. In addition, an individual can be handling different products in their capacities at the different legal entities. This data can be retrieved from data sources, such as the databases 106 and 108.

After completion of the operation 402, the method 400 can perform an operation 404, where the first data set can be stored as a GC at a database. The database can be the database 112 at the CM 102, where a GC, such as the GC 114, can be stored at the database 112.

In addition, the method 400 can perform an operation 406, where the second data set can be stored at a cross-reference table that is associated with the first database. In examples, by virtue of being associated with the first database, the cross-reference table can be linked to the GC stored at the first database. As described above, the cross-reference table can be the source of the data in the GC. Thus, the second data set can be the source of the first data where, by virtue of associating the cross-reference table with the first database, the cross-reference table can be linked to the GC. While the operation 406 is described as being performed after the operation 404, the operation 406 could be performed before the operation 404 or simultaneously with the operation 404, i.e., at the same time as the operation 404.

As an example of the method 400 and referred to herein as "the illustration," reference is made to FIG. 1. During the operation 402, the CM system 102 can retrieve the baseline data 206 from the database 116. Moreover, during the operation 402, the CM system 102 retrieves the contact information 212 corresponding to the phone number (612) 373-6900. However, the CM system 102 also retrieves a phone number (612) 555-5555. In the illustration, the contact information 212 was retrieved from documents relating to the opening of a deposit account on behalf of an entity. Here, the phone number (612) 555-5555 was retrieved from a second source relating to a business contact entry, which, historically, is less reliable than a source relating to the opening of a deposit account. Therefore, during the operation 402, the CM system 102 determines that the telephone number from the source relating to the opening of a deposit account has a higher winnability score and uses this phone number for the first data set. The CM system 102 also retrieves the user id 208 and the internal database identifier 210 during the operation 402. In the illustration, the CM system 102 also retrieves baseline data 306 as a first data set during the operation 402.

During the operation 402, the CM system 102 can also retrieve a second data set from the databases 106 and 108. Here, for the user id 208 pertaining to the baseline data 206, the CM system 102 can retrieve the data associated with the legal entities 214-218, the data associated with the email addresses 220-224, the data associated roles 226-230, and the data associated with the products 232-236. Furthermore, for the user id 308, the CM system 102 can retrieve the data associated with the legal entities 214 and 314, the data associated with the email addresses 316 and 318, the data associated with the roles 320 and 322, and the data associated with the products 232 and 324.

Still sticking with the illustration, during the operation 404, the CM system stores the first data set having the baseline data 206 as the GC 114 at the database 112. Additionally, the CM system 102 stores the baseline data 306 as the GC 300 at the database 112 in the illustration. During the operation 406, the CM system 102 can create the cross-reference tables 200-204 and store data associated with the legal entities 214-218, the email addresses 220-224, associated roles 226-230, and the products 232-236 at the cross-reference tables 200-204, as shown in FIG. 2. Furthermore, the CM system 102 can create the cross-reference tables 302 and 304 and store data associated with the legal entities 214 and 314, the email addresses 316 and 318, the associated roles 320 and 322, and the products 232 and 324 at the cross-reference tables 302 and 304, as shown in FIG. 3.

Referring back to FIG. 4A and the method 400, after the operation 406, the method 400 can perform an operation 408, where a data request for requested information is received. A user can provide a data request for any data during the operation 406, where the requested information can relate to the data requested by the user. Upon receiving the data request, the method 400 can perform an operation 410, where the second data set is retrieved from the database based on the requested information. In particular, the cross-reference tables created and stored during the operation 416 can be retrieved and searched during the operation 410. If the requested information in the data request was for a particular legal entity, the second data sets, i.e., the cross-reference tables, can be retrieved and searched for the legal entity. Similarly, if the requested information in the data request was for a role, the second data sets, i.e., the cross-reference tables, can be retrieved and searched for the role. If the requested information in the data request was for a particular product, the second data sets, i.e., the cross-reference tables, can be retrieved and searched for the particular product.

After retrieving the second data set in the operation 410, a first data set that is linked with the second data set can be retrieved during the operation 412. As discussed above, the cross-reference tables are linked to the GCs where the cross-reference tables are the sources for the GCs. During the operation 412, the GCs linked to the retrieved cross-reference tables can be retrieved.

Figure 5:
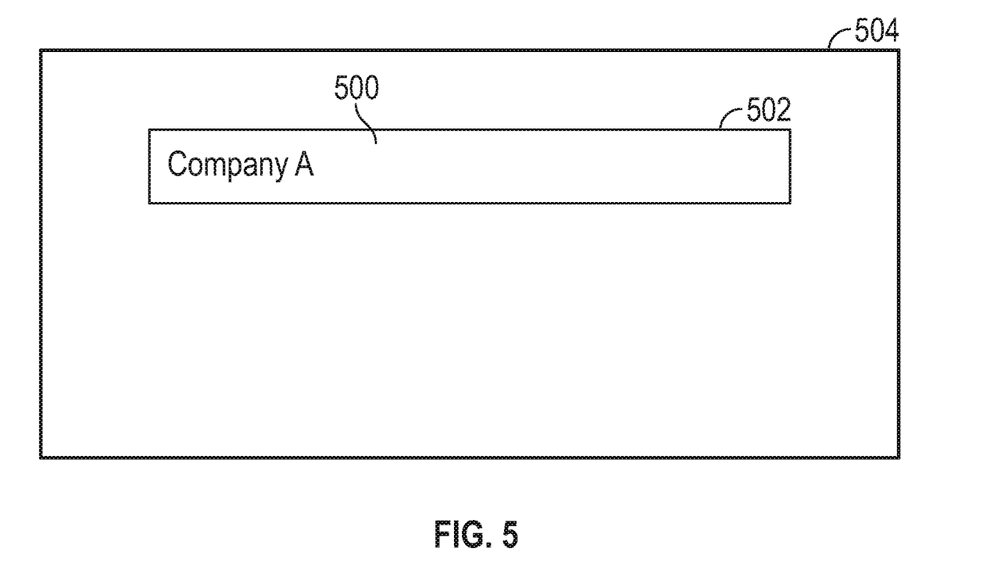
FIG. 5 illustrates a user interface that can be used to receive a search request, in accordance with examples.

Turning attention back to the illustration and FIG. 5, during the operation 408, a user inputs requested information 500 corresponding to a legal entity having the name "Company A" at an input field 502 of a user interface 504. Here, the user interface 504 can provide a means for providing a data request, such as the requested information. The requested information 500 is received by the CM system 102 during the operation 408 and the CM system 102 retrieves second data sets during the operation 410. More specifically, during the operation 410, the CM system 102 searches the cross-reference tables 200-204, 302, and 304 for the legal entity having the name "Company A." During the operation 410, the CM system 102 finds that the cross-reference tables 200 and 302 include the legal entity having the name "Company A." Thus, the CM system 102 retrieves the cross-reference tables 200 and 302, which can be the second data sets, during the operation 410. The cross-reference table 200 is linked to the GC 114 and the cross-reference table 302 is linked to the GC 300. Accordingly, during the operation 412, the CM system 102 retrieves the GC 112 and the GC 300.

Figure 4B:
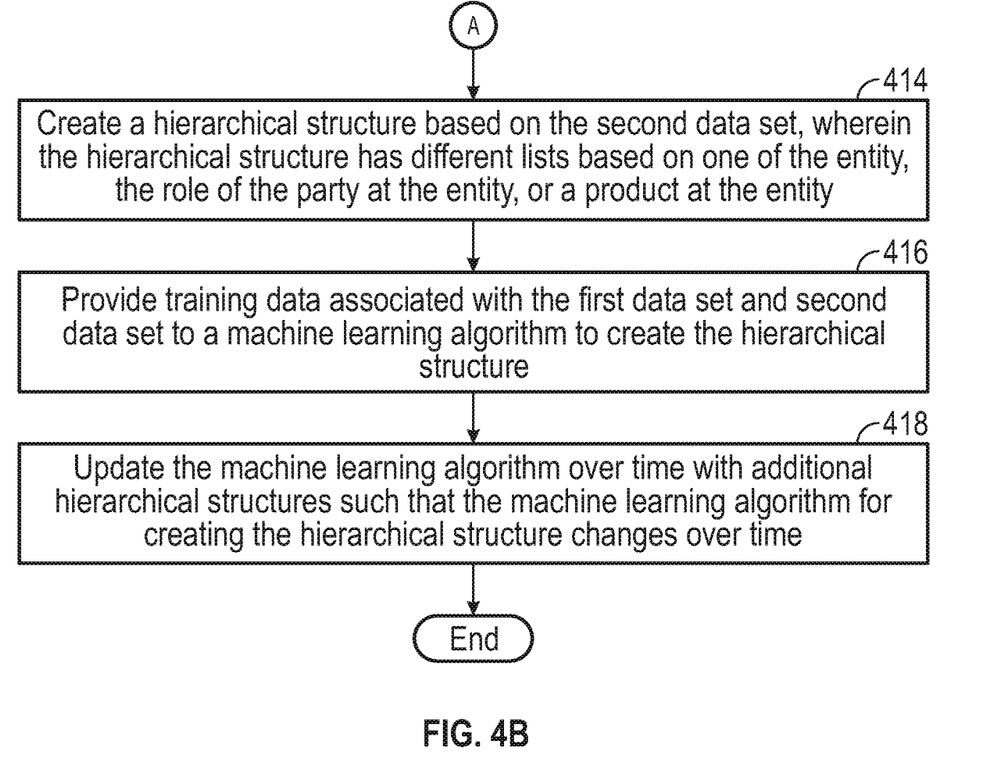

Making reference to FIG. 4B and the method 400, once the first and second data sets are retrieved during the operations 410 and 412, the method 400 performs an operation 414. During the operation 414, a hierarchical structure is created based on the second data set. The hierarchical structure can include different lists based on one of the legal entity, a role of the party at the legal entity, and a product. Thus, if the requested information related to a legal entity, a hierarchical structure listing individuals at the legal entity would be created. Similarly, if the requested information related to a role, a hierarchical structure listing individuals having the role would be created. Moreover, if the requested information related to a product, a hierarchical structure listing products that individuals at the legal entity handle would be created.

Figure 6:
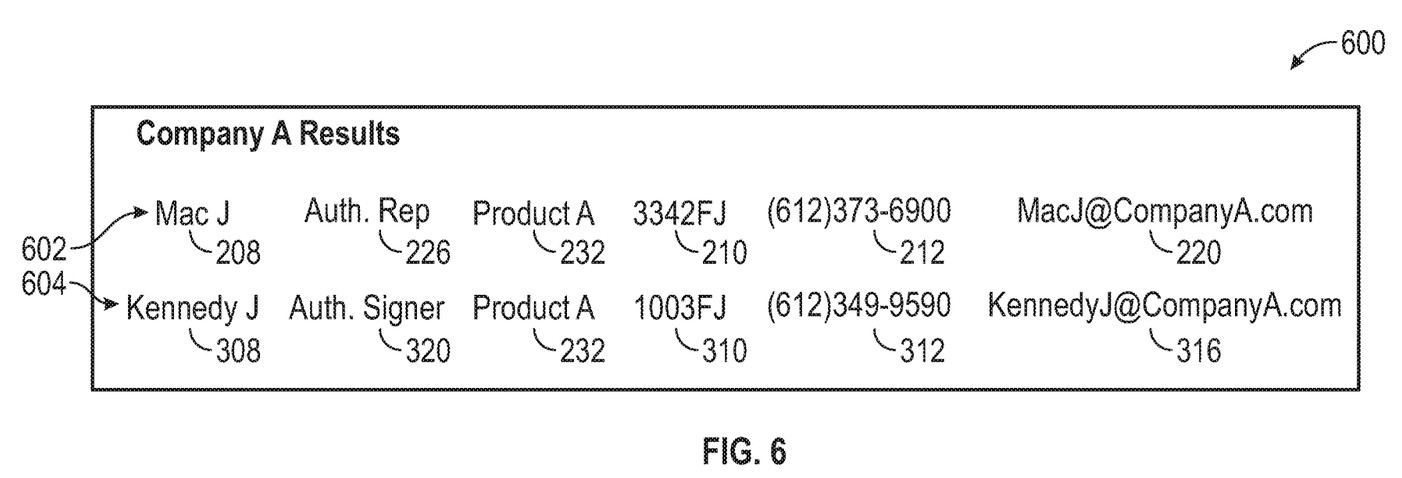
FIGS. 6 and 7 are hierarchical structures that can be created using the cross-reference tables of FIGS. 2 and 3, in accordance with examples.

Making reference once again to the illustration, the requested information related to the legal entity having the name "Company A" where the cross-reference tables 200 and 302 were retrieved during the operation 410 since each of these cross-reference tables relate to the legal entity 214 having the name "Company A." At the operation 414, a hierarchical structure 600, as shown with reference to FIG. 6, is created. The hierarchical structure 600 can list those contacts that are associated with the legal entity having the name "Company A." More specifically, the hierarchical structure 600 can include the list 602 that has the user id 208, the internal database identifier 210, and the contact information 212. The list 602 also includes the email address 220, the role 226, and the product 232. The hierarchical structure 600 can also include the list 604 that has the user id 308, the internal database identifier 310, and the contact information 312. The list 604 can also have the email address 316, the product 232, and the role 320. In examples, the hierarchical structure 600 can be displayed on the RM device 104.

Returning attention to FIG. 4B and the method 400, after the hierarchical structure is created during the operation 414, the method 400 can perform an operation 416, where training data associated with the first data set and the second data that was used to create the hierarchical structure is provided to a machine learning algorithm. Here, the training data, i.e., the first and second data sets and the created hierarchical structures, can be used to train a machine learning algorithm such that the machine learning algorithm can be used to create hierarchical structures.

After the method 400 performs the operation 416, the method 400 can perform the operation 418, where the machine learning algorithm can be updated over time with additional hierarchical structures and data sets, such as additional first and second data sets, such that the machine learning algorithm that can be used for creating hierarchical structures can change over time.

Returning to the illustration and FIG. 1, during the operation 416, the CM system 102 can provide the GCs 114 and 300 and the cross-reference tables 200 and 302 along with the hierarchical structure 600 to a machine learning algorithm 120 as training data. Furthermore, the CM system 102 can update the machine learning algorithm 120 over time with additional hierarchical structures and data sets such that the machine learning algorithm 120 can change over time during the operation 418. Upon completion of the operation 418, the method 400 is complete.

Figure 7:
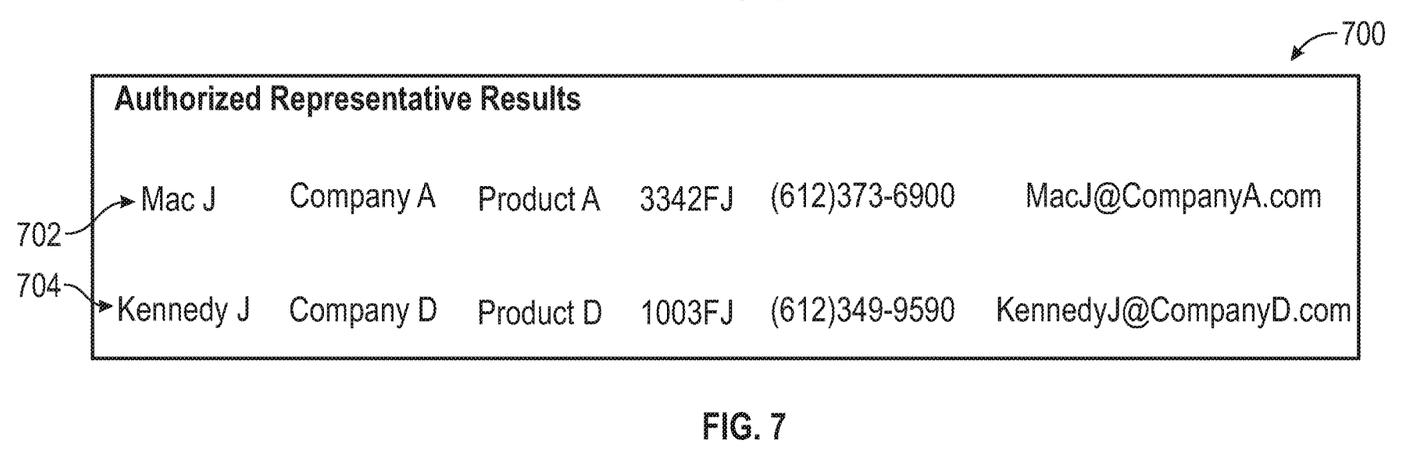

In the description above, the hierarchical structure 600, which was created based on a legal entity, was shown being created. Additional hierarchical structures, such as a hierarchical structure 700 shown with reference to FIG. 7, can also be created in accordance with the discussion herein. In particular, the hierarchical structure 700 can be created based on requested information that relates to the role of an authorized representative. The hierarchical structure 700 can include lists 702 and 704. The list 702 can be created using the cross-reference table 200 and the GC 114 as discussed herein. The list 704 can be created using the cross-reference table 304 and the GC 300, also as discussed herein.

Figure 8:
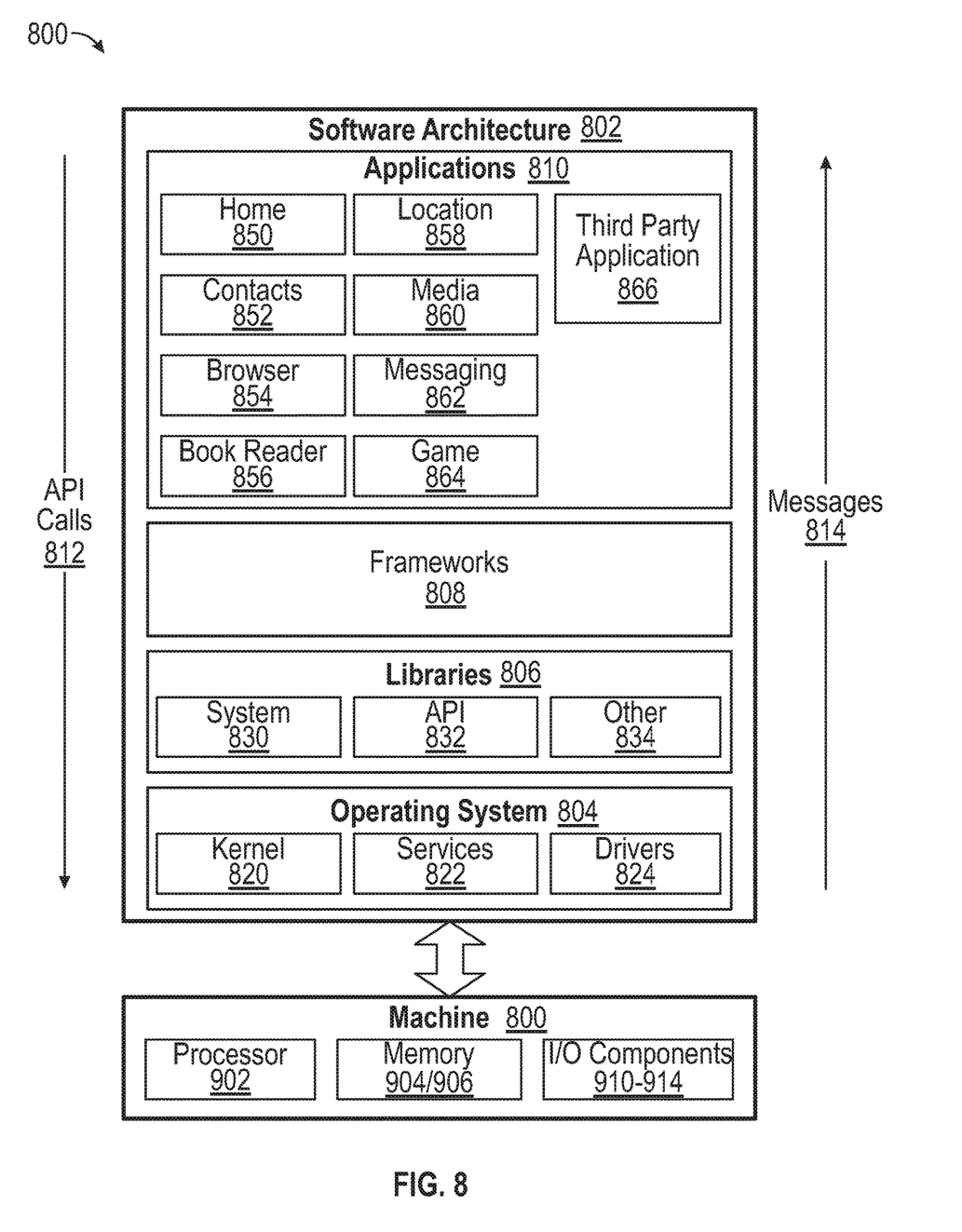
FIG. 8 is a block diagram showing one example of a software architecture for a computing device, in accordance with examples.

FIG. 8 is a block diagram 800 illustrating a software architecture 802, which may be installed on any one or more of the devices described above. FIG. 8 is merely a non-limiting example of a software architecture, and it will be appreciated that many other architectures may be implemented to facilitate the functionality described herein. The software architecture 802 may be implemented by hardware such as a machine 800 of FIG. 8 that includes a processor 802, memory 804 and 806, and I/O components 910-914. In this example, the software architecture 802 may be conceptualized as a stack of layers where each layer may provide a particular functionality. For example, the software architecture 802 includes layers such as an operating system 804, libraries 806, frameworks 808, and applications 810. Operationally, the applications 810 invoke application programming interface (API) calls 812 through the software stack and receive messages 814 in response to the API calls 812, according to some implementations.

In various implementations, the operating system 804 manages hardware resources and provides common services. The operating system 804 includes, for example, a kernel 820, services 822, and drivers 824. The kernel 820 acts as an abstraction layer between the hardware and the other software layers in some implementations. For example, the kernel 820 provides memory management, processor management (e.g., scheduling), component management, networking, and security settings, among other functionality. The services 822 may provide other common services for the other software layers. The drivers 824 may be responsible for controlling or interfacing with the underlying hardware. For instance, the drivers 824 may include display drivers, camera drivers, Bluetooth® drivers, flash memory drivers, serial communication drivers (e.g., Universal Serial Bus (USB) drivers), Wi-Fi® drivers, audio drivers, power management drivers, and so forth.

In some implementations, the libraries 806 provide a low-level common infrastructure that may be utilized by the applications 810. The libraries 806 may include system libraries 830 (e.g., C standard library) that may provide functions such as memory allocation functions, string manipulation functions, mathematic functions, and the like. In addition, the libraries 806 may include API libraries 832 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic context on a display), database libraries (e.g., SQLite to provide various relational database functions), web libraries (e.g., WebKit to provide web browsing functionality), and the like. The libraries 806 may also include a wide variety of other libraries 834 to provide many other APIs to the applications 810.

The frameworks 808 provide a high-level common infrastructure that may be utilized by the applications 810, according to some implementations. For example, the frameworks 808 provide various graphic user interface (GUI) functions, high-level resource management, high-level location services, and so forth. The frameworks 808 may provide a broad spectrum of other APIs that may be utilized by the applications 810, some of which may be specific to a particular operating system or platform.

In an example, the applications 810 include a home application 850, a contacts application 852, a browser application 854, a book reader application 856, a location application 858, a media application 860, a messaging application 862, a game application 864, and a broad assortment of other applications such as a third-party application 766. According to some examples, the applications 810 are programs that execute functions defined in the programs. Various programming languages may be employed to create one or more of the applications 810, structured in a variety of manners, such as object-orientated programming languages (e.g., Objective-C, Java, or C++) or procedural programming languages (e.g., C or assembly language). In a specific example, the third-party application 866 (e.g., an application developed using the Android™ or iOS™ software development kit (SDK) by an entity other than the vendor of the particular platform) may be mobile software running on a mobile operating system such as iOS™, Android™, Windows® Phone, or other mobile operating systems. In this example, the third-party application 866 may invoke the API calls 812 provided by the mobile operating system (e.g., the operating system 804) to facilitate functionality described herein.

Certain examples are described herein as including logic or a number of components, modules, or mechanisms. Modules may constitute either software modules (e.g., code embodied (1) on a non-transitory machine-readable medium or (2) in a transmission signal) or hardware-implemented modules. A hardware-implemented module is a tangible unit capable of performing certain operations and may be configured or arranged in a certain manner. In examples, one or more computer systems (e.g., a standalone, client or server computer system) or one or more processors may be configured by software (e.g., an application or application portion) as a hardware-implemented module that operates to perform certain operations as described herein.

In various examples, a hardware-implemented module may be implemented mechanically or electronically. For example, a hardware-implemented module may include dedicated circuitry or logic that is permanently configured (e.g., as a special-purpose processor, such as a field programmable gate array (FPGA) or an application-specific integrated circuit (ASIC)) to perform certain operations. A hardware-implemented module may also include programmable logic or circuitry (e.g., as encompassed within a general-purpose processor or other programmable processor) that is temporarily configured by software to perform certain operations. It will be appreciated that the decision to implement a hardware-implemented module mechanically, in dedicated and permanently configured circuitry, or in temporarily configured circuitry (e.g., configured by software) may be driven by cost and time considerations.

Accordingly, the term "hardware-implemented module" should be understood to encompass a tangible entity, be that an entity that is physically constructed, permanently configured (e.g., hardwired) or temporarily or transitorily configured (e.g., programmed) to operate in a certain manner and/or to perform certain operations described herein. Considering examples in which hardware-implemented modules are temporarily configured (e.g., programmed), each of the hardware-implemented modules need not be configured or instantiated at any one instance in time. For example, where the hardware-implemented modules include a general-purpose processor configured using software, the general-purpose processor may be configured as respectively different hardware-implemented modules at different times. Software may, accordingly, configure a processor, for example, to constitute a particular hardware-implemented module at one instance of time and to constitute a different hardware-implemented module at a different instance of time.

Hardware-implemented modules can provide information to, and receive information from, other hardware-implemented modules. Accordingly, the described hardware-implemented modules may be regarded as being communicatively coupled. Where multiples of such hardware-implemented modules exist contemporaneously, communications may be achieved through signal transmission (e.g., over appropriate circuits and buses) that connects the hardware-implemented modules. In examples in which multiple hardware-implemented modules are configured or instantiated at different times, communications between such hardware-implemented modules may be achieved, for example, through the storage and retrieval of information in memory structures to which the multiple hardware-implemented modules have access. For example, one hardware-implemented module may perform an operation and store the output of that operation in a memory device to which it is communicatively coupled. A further hardware-implemented module may then, at a later time, access the memory device to retrieve and process the stored output. Hardware-implemented modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some examples, include processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but also deployed across a number of machines. In some examples, the processor or processors may be located in a single location (e.g., within a home environment, an office environment or as a server farm), while in other examples, the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via the network 106 (e.g., the Internet) and via one or more appropriate interfaces (e.g., application program interfaces (APIs).)

Examples may be implemented in digital electronic circuitry, or in computer hardware, firmware, software, or in combinations of them. Examples may be implemented using a computer program product, e.g., a computer program tangibly embodied in an information carrier, e.g., in a machine-readable medium for execution by, or to control the operation of data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers, at one site or distributed across multiple sites, and interconnected by a communication network.

The computing system can include clients and servers. A client and server are generally remote from each other and typically interact through a communication network. The relationship of client and server arises by virtue of computer programs running on the respective computers and having a client-server relationship to each other. In examples deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various examples.

Figure 9:
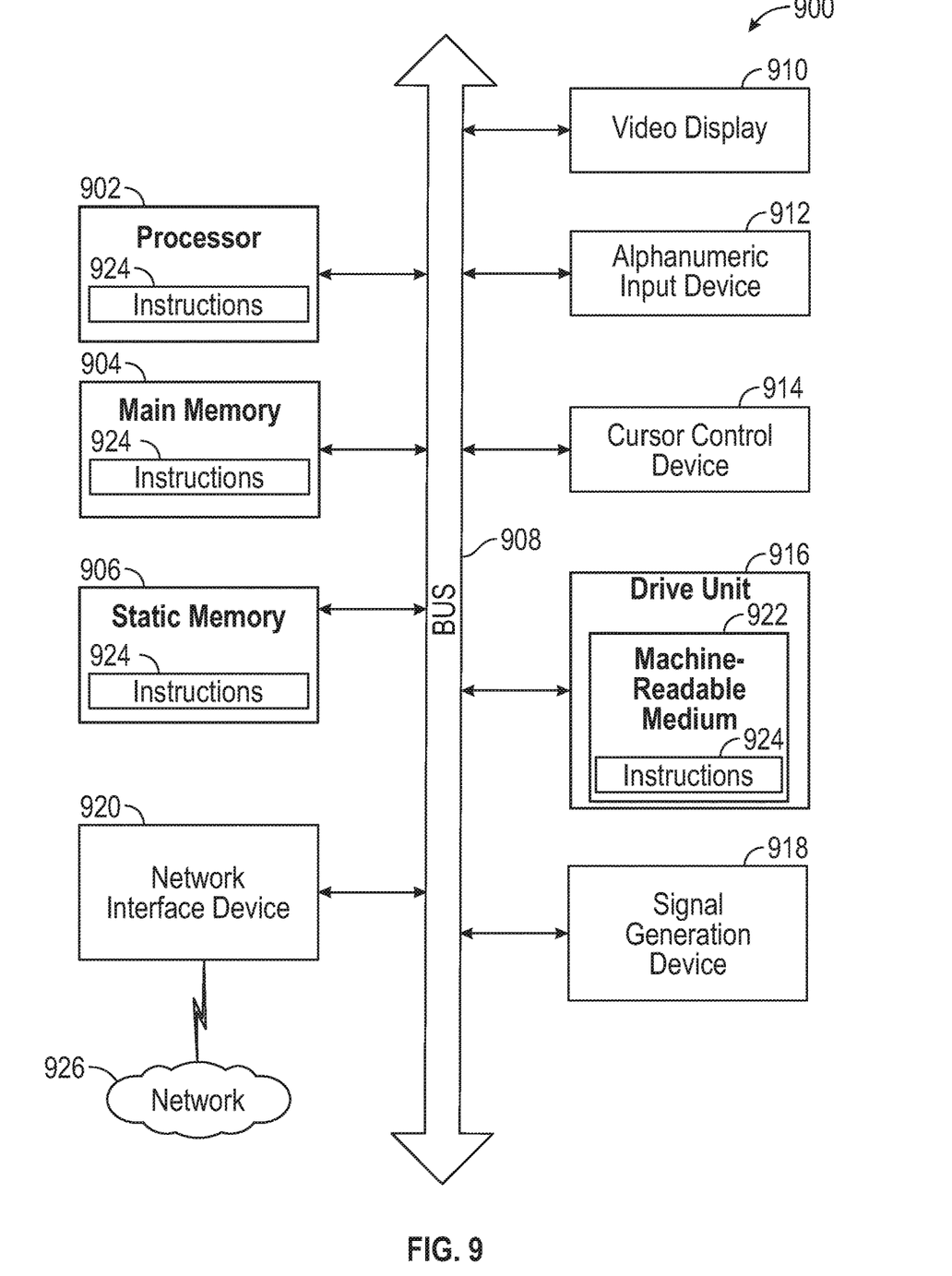
FIG. 9 is a block diagram illustrating a computing device hardware architecture, within which a set or sequence of instructions can be executed to cause the machine to perform examples of any one of the methodologies discussed herein, in accordance with examples.

FIG. 9 is a block diagram of a machine within which instructions may be executed for causing the machine to perform any one or more of the methodologies discussed herein. In one example, the machine may be any of the devices described above. In alternative examples, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a personal digital assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that, individually or jointly, execute a set (or multiple sets) of instructions to perform any one or more of the methodologies discussed herein.

The example computer system 900 includes a processor 902 (e.g., a central processing unit (CPU), a graphics processing unit (GPU) or both), a main memory 904 and a static memory 906, which communicate with each other via a bus 908. The computer system 900 may further include a video display unit 610 (e.g., a liquid crystal display (LCD) or a cathode ray tube (CRT)). The computer system 900 also includes an alphanumeric input device 912 (e.g., a keyboard), a user interface (UI) navigation device (cursor control device) 914 (e.g., a mouse), a disk drive unit 916, a signal generation device 918 (e.g., a speaker) and a network interface device 920.

The drive unit 916 includes a machine-readable medium 922 on which is stored one or more sets of instructions and data structures (e.g., software) 924 embodying or utilized by any one or more of the methodologies or functions described herein. The instructions 924 may also reside, completely or at least partially, within the main memory 904 and/or within the processor 902 during execution thereof by the computer system 900, the main memory 904 and the processor 902 also constituting machine-readable media. Instructions 924 may also reside within the static memory 906.

While the machine-readable medium 922 is shown in an example to be a single medium, the term "machine-readable medium" may include a single medium or multiple media (e.g., a centralized or distributed database, and/or associated caches and servers) that store the one or more instructions or data instructions 924. The term "machine-readable medium" shall also be taken to include any tangible medium that is capable of storing, encoding or carrying instructions 924 for execution by the machine and that cause the machine to perform any one or more of the methodologies of the present invention, or that is capable of storing, encoding or carrying data structures utilized by or associated with such instructions 924. The term "machine-readable medium" shall accordingly be taken to include, but not be limited to, solid-state memories, and optical and magnetic media. Specific examples of machine-readable media include non-volatile memory, including by way of example, semiconductor memory devices, e.g., erasable programmable read-only memory (EPROM), electrically erasable programmable read-only memory (EEPROM), and flash memory devices; magnetic disks, such as internal hard disks and removable disks; magneto-optical disks; and CD-ROM and DVD-ROM disks.

The instructions 924 may further be transmitted or received over a communications network 926 using a transmission medium. The instructions 924 may be transmitted using the network interface device 920 and any one of a number of well-known transfer protocols (e.g., HTTP). Examples of communication networks include a local area network ("LAN"), a wide area network ("WAN"), the Internet, mobile telephone networks, plain old telephone (POTS) networks, and wireless data networks (e.g., Wi-Fi and Wi-Max networks). The term "transmission medium" shall be taken to include any intangible medium that is capable of storing, encoding or carrying instructions 924 for execution by the machine, and includes digital or analog communications signals or other intangible media to facilitate communication of such software.

In various example examples, one or more portions of the network 926 may be an ad hoc network, an intranet, an extranet, a VPN, a LAN, a WLAN, a WAN, a WWAN, a MAN, the Internet, a portion of the Internet, a portion of the PSTN, a plain old telephone service (POTS) network, a cellular telephone network, a wireless network, a Wi-Fi® network, another type of network, or a combination of two or more such networks. For example, the network 926 or a portion of the network 926 may include a wireless or cellular network, and the coupling may be a Code Division Multiple Access (CDMA) connection, a Global System for Mobile communications (GSM) connection, or another type of cellular or wireless coupling. In this example, a coupling may implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology. Although an example has been described with reference to specific examples, it will be evident that various modifications and changes may be made to these examples without departing from the broader spirit and scope of the invention. Accordingly, the specification and drawings are to be regarded in an illustrative rather than a restrictive sense. The accompanying drawings that form a part hereof, show by way of illustration, and not of limitation, specific examples in which the subject matter may be practiced. The examples illustrated are described in sufficient detail to enable those skilled in the art to practice the teachings disclosed herein. Other examples may be utilized and derived therefrom, such that structural and logical substitutions and changes may be made without departing from the scope of this disclosure. This Detailed Description, therefore, is not to be taken in a limiting sense, and the scope of various examples is defined only by the appended claims, along with the full range of equivalents to which such claims are entitled.

Such examples of the inventive subject matter may be referred to herein, individually and/or collectively, by the term "invention" merely for convenience and without intending to voluntarily limit the scope of this application to any single invention or inventive concept if more than one is in fact disclosed. Thus, although specific examples have been illustrated and described herein, it should be appreciated that any arrangement calculated to achieve the same purpose may be substituted for the specific examples shown. This disclosure is intended to cover any and all adaptations or variations of various examples. Combinations of the above examples, and other examples not specifically described herein, will be apparent to those of skill in the art upon reviewing the above description.

The Abstract of the Disclosure is provided to comply with 37 C.F.R. § 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single example for the purpose of streamlining the disclosure. This method of disclosure is not to be interpreted as reflecting an intention that the claimed examples require more features than are expressly recited in each claim. Rather, as the following claims reflect, inventive subject matter lies in less than all features of a single disclosed example. Thus, the following claims are hereby incorporated into the Detailed Description, with each claim standing on its own as a separate example.

The terms "machine-readable medium," "computer-readable medium" and "device-readable medium" mean the same thing and may be used interchangeably in this disclosure. The terms are defined to include both machine-storage media and transmission media. Thus, the terms include both storage devices/media and carrier waves/modulated data signals.

The invention claimed is:

1. A system comprising:
processing circuitry; and
a memory device including instructions embodied thereon, wherein the instructions, which when executed by the processing circuitry, configure the processing circuitry to perform operations that:
retrieve data from an information source, the data including:
a first data set associated with a party; and
second data sets, each of the second data sets including:
a respective entity associated with the party; and
a respective role of the party at the entity;
store the first data set at a database;
store the second data sets at a cross-reference table associated with the database, wherein the first data set is pulled from data from ones of the second data sets based on winnability scores associated with the first data pulled according to the winnability scores, wherein the winnability score is based on a source of the first data set;
receive a data request for requested information;
retrieve the first data set from the database;
retrieve the second data sets from the cross-reference table based on the first data set;
create a hierarchical structure based on the second data set, wherein the hierarchical structure has different lists based on one of the entity and the respective role of the party at the entity, the hierarchical structure being created based on the first data pulled according to the winnability scores;
provide training data associated with the first data set and the second data sets to a machine learning algorithm to create the hierarchical structure; and
update the machine learning algorithm over time with additional hierarchical structures such that the machine learning algorithm for creating hierarchical structure changes over time.

2. The system of claim 1, wherein the instructions further configure the processing circuitry to filter the data from the information source based on one of a timestamp associated with the data or a trustworthiness of the information source.

3. The system of claim 1, wherein the second data se further include a product being handled the party.

4. The system of claim 3, wherein the hierarchical structure is configurable based on the product being handled the party.

5. The system of claim 3, wherein the instructions further configure the processing circuitry to retrieve a third data set from another information source, the third data set including:
a second entity associated with a second party;
the entity associated with a third party;
the respective role of the second party at the second entity;
a second role of the third party at the entity;
the product associated with the second party; and
a second product associate with the third party.

6. The system of claim 5, wherein the data request includes an entity request for parties associated with the entity and the instructions further configure the processing circuitry to create the hierarchical structure according to the entity such that an entity hierarchical structure lists the party and the third party, the entity, the respective role of the party, the second role of the third party, the product associated with the party, and the second product associated with the third party.

7. The system of claim 6, wherein the data request includes a role request for parties having a certain role and the instructions further configure the processing circuitry to create the hierarchical structure according to the role request such that a role hierarchical structure lists the party and the second party, the entity and the second entity, the respective role of the party and the respective role of the second party, the product associated with the party, and the product associated with the second party, wherein the role hierarchical structure is different from the entity hierarchical structure.

8. The system of claim 6, wherein the data request includes a product request for parties associated with a certain product and the instructions further configure the processing circuitry to create the hierarchical structure according to a role request such that a product hierarchical structure lists the party and the second party, the entity, the second entity, the product associated with the party, and the product associated with the second party, wherein the product hierarchical structure is different from a role hierarchical structure and the entity hierarchical structure.

9. A non-transitory, machine-readable medium, comprising instructions, which when performed by a processor of a machine, causes the processor to perform operations to:
   retrieve data from an information source, the data including:
      a first data set associated with a party; and
      second data sets that include:
         an a respective entity associated with the party; and
         a respective role of the party at the entity;
   store the first data set at a database;
   store the second data sets at a cross-reference table associated with the database, wherein the first data set is pulled from data from ones of the second data sets based on winnability scores associated with the first data pulled according to the winnability scores, wherein the winnability score is based on a source of the first data set;
   receive a data request for requested information;
   retrieve the first data set from the database;
   retrieve the second data sets from the cross-reference table based on the first data set;
   create a hierarchical structure based on the second data sets, wherein the hierarchical structure has different lists based on one of the entity and the respective role of the party at the entity, the hierarchical structure being created based on the first data pulled according to the winnability scores;
   provide training data associated with the first data set and the second data sets to a machine learning algorithm to create the hierarchical structure; and
   update the machine learning algorithm over time with additional hierarchical structures such that the machine learning algorithm for creating hierarchical structure changes over time.

10. The non-transitory, machine-readable medium of claim 9, wherein the second data sets further include a product being handled by the party.

11. The non-transitory, machine-readable medium of claim 10, wherein the hierarchical structure is configurable based on the product being handled by the party.

12. The non-transitory, machine-readable medium of claim 10, wherein the instructions further cause the processor to perform operations to retrieve a third data set from another information source, the third data set including:
   a second entity associated with a second party;
   the entity associated with a third party;
   the respective role of the second party at the second entity;
   a second role of the third party at the entity;
   the product associated with the second party; and
   a second product associate with the third party.

13. The non-transitory, machine-readable medium of claim 12, wherein the data request includes an entity request for parties associated with the entity and the instructions further cause the processor to perform operations to create the hierarchical structure according to the entity such that an entity hierarchical structure lists the party and the third party, the entity, the respective role of the party, the second role of the third party, the product associated with the party, and the second product associated with the third party.

14. The non-transitory, machine-readable medium of claim 13, wherein the data request includes a role request for parties having a certain role and the instructions further cause the processor to perform operations to create the hierarchical structure according to the role request such that a role hierarchical structure lists the party and the second party, the entity and the second entity, the respective role of the party and the respective role of the second party, the product associated with the party, and the product associated with the second party, wherein the role hierarchical structure is different from the entity hierarchical structure.

15. The non-transitory, machine-readable medium of claim 13, wherein the data request includes a product request for parties associated with a certain product and the instructions cause the processor to perform operations to create the hierarchical structure according to a role request such that a product hierarchical structure lists the party and the second party, the entity, the second entity, the product associated with the party, and the product associated with the second party, wherein the product hierarchical structure is different from a role hierarchical structure and the entity hierarchical structure.

16. A method comprising:
   retrieving data from an information source, the data including:
      a first data set associated with a party; and
      second data sets that include:
         a respective entity associated with the party; and
         a respective role of the party at the entity;
   storing the first data set at a database;
   storing the second data sets at a cross-reference table associated with the database, wherein the first data set is pulled from data from ones of the second data sets based on winnability scores associated with the first data pulled according to the winnability scores, wherein the winnability score is based on a source of the first data set;
   receiving a data request for requested information;
   retrieving the first data set from the database;
   retrieving the second data sets from the cross-reference table based on the first data set;
   creating a hierarchical structure based on the second data, wherein the hierarchical structure has different lists based on one of the entity and the respective role of the party at the entity, the hierarchical structure being created based on the first data pulled according to the winnability scores;

providing training data associated with the first data set and the second data sets to a machine learning algorithm to create the hierarchical structure; and updating the machine learning algorithm over time with additional hierarchical structures such that the machine learning algorithm for creating hierarchical structure changes over time.

17. The method of claim 16, wherein the second data sets further include a product being handled by the party and the method further comprises retrieving a third data set from another information source, the third data set including:

a second entity associated with a second party;
the entity associated with a third party;
the respective role of the second party at the second entity;
a second role of the third party at the entity;
the product associated with the second party; and
a second product associate with the third party.

18. The method of claim 17, wherein the data request includes an entity request for parties associated with the entity and the method further comprises creating the hierarchical structure according to the entity such that an entity hierarchical structure lists the party and the third party, the entity, the respective role of the party, the second role of the third party, the product associated with the party, and the second product associated with the third party.

19. The method of claim 18, wherein the data request includes a role request for parties having a certain role and the method further comprises creating the hierarchical structure according to the role request such that a role hierarchical structure lists the party and the second party, the entity and the second entity, the respective role of the party and the respective role of the second party, the product associated with the party, and the product associated with the second party, wherein the role hierarchical structure is different from the entity hierarchical structure.

20. The method of claim 18, wherein the data request includes a product request for parties associated with a certain product and the method further comprises creating the hierarchical structure according to a role request such that a product hierarchical structure lists the party and the second party, the entity, the second entity, the product associated with the party, and the product associated with the second party, wherein the product hierarchical structure is different from a role hierarchical structure and the entity hierarchical structure.

* * * * *

UNITED STATES PATENT AND TRADEMARK OFFICE
CERTIFICATE OF CORRECTION

| | | |
|---|---|---|
| PATENT NO. | : 12,032,597 B1 | Page 1 of 1 |
| APPLICATION NO. | : 18/154969 | |
| DATED | : July 9, 2024 | |
| INVENTOR(S) | : Eisenman et al. | |

It is certified that error appears in the above-identified patent and that said Letters Patent is hereby corrected as shown below:

In the Claims

In Column 18, Line 49, in Claim 3, delete "se" and insert --sets-- therefor

In Column 19, Line 35, in Claim 9, before "a", delete "an"

In Column 20, Line 62, in Claim 16, delete "data," and insert --data sets,-- therefor Signed and Sealed this
Eighteenth Day of March, 2025

Coke Morgan Stewart
*Acting Director of the United States Patent and Trademark Office*